Dec. 26, 1933.　　　P. B. REEVES　　　1,941,417
VARIABLE SPEED UNIT
Filed April 23, 1930　　　3 Sheets-Sheet 1
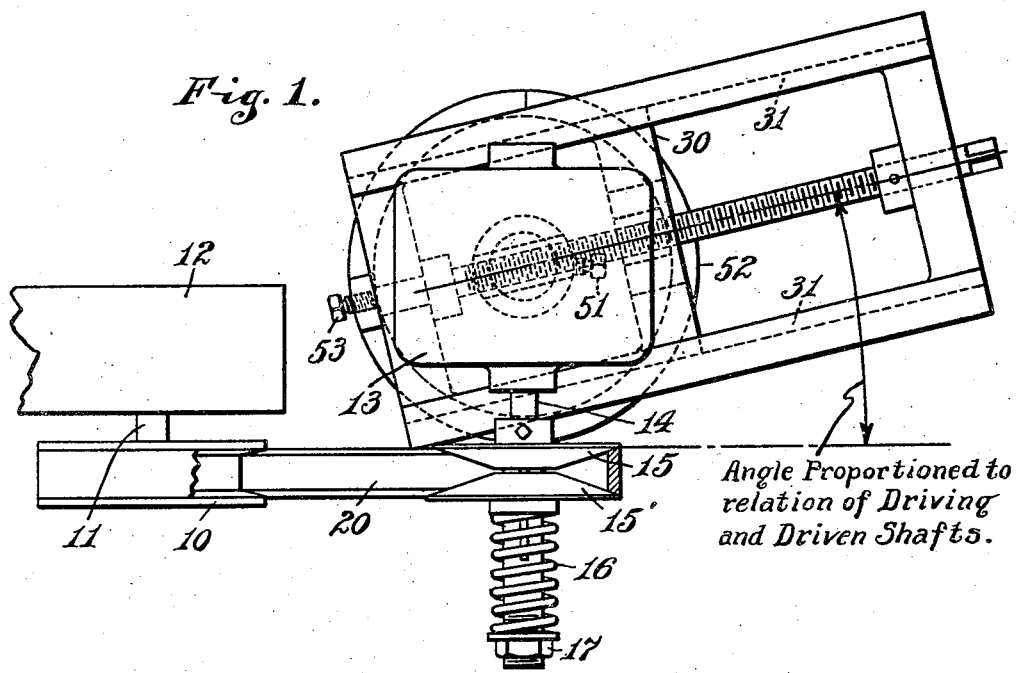
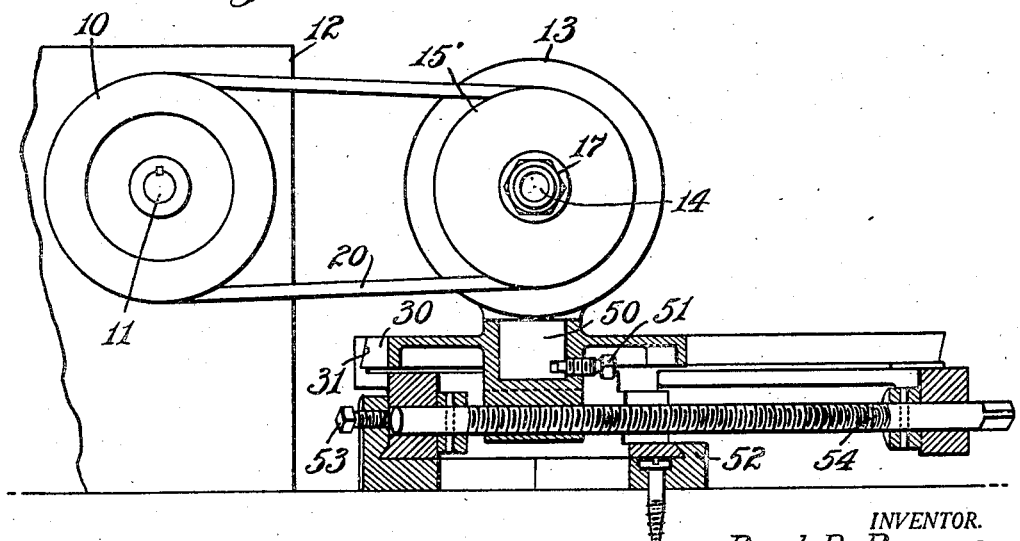
INVENTOR.
Paul B. Reeves,
BY
Hood + Hahn.
ATTORNEYS

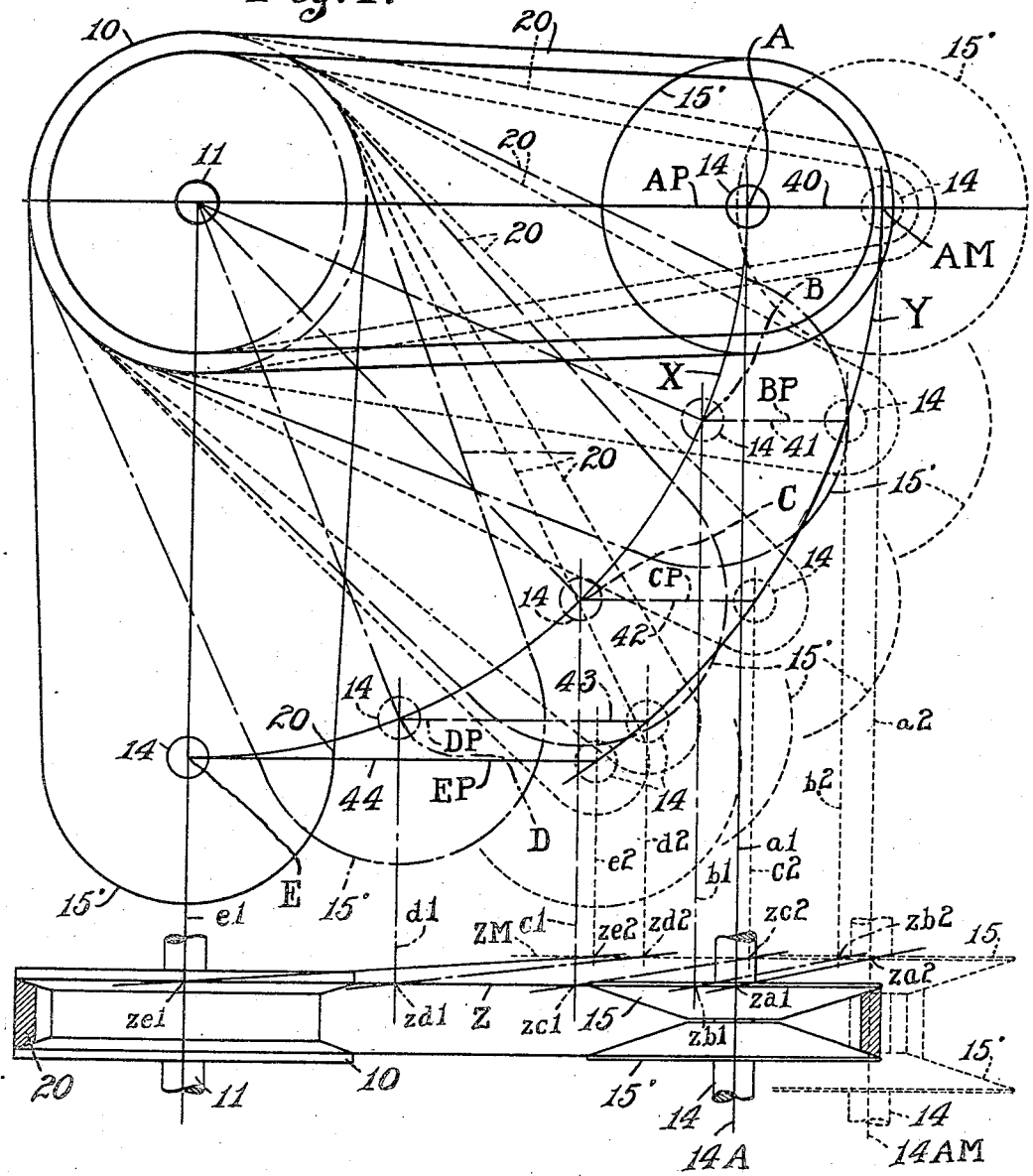

Patented Dec. 26, 1933

1,941,417

UNITED STATES PATENT OFFICE 1,941,417

VARIABLE SPEED UNIT

Paul B. Reeves, Indianapolis, Ind., assignor to Reeves Pulley Company, Columbus, Ind., a corporation of Indiana Application April 23, 1930. Serial No. 446,675

8 Claims. (Cl. 64—8)

The object of my invention is to produce a speed-varying transmission unit of simple character embodying a V-belt, a cooperating pair of oppositely placed cones which are spring-pressed together and between which the belt rides at various radii with its edges in engagement with the cones, a cooperating fixed diameter grooved pulley over which the belt also rides, and means for simultaneously shifting either the fixed diameter pulley or the cone-pair both laterally and axially, whereby the belt may be caused to co-operatively engage the cone-pair at any desired radius under such conditions that the belt in any position of adjustment will not have any tendency to ride the flanges of the fixed-diameter pulley.

The accompanying drawings illustrate my invention.

Fig. 1 is a plan of a unit embodying my invention with a portion of the belt broken away to show the cone-pair carried by the motor shaft;

Fig. 2 is an end elevation in partial vertical section of the construction shown in Fig. 1, wherein the motor shaft is adjustable in the plane of the driven shaft;

Fig. 4 is a diagram showing the manner of determining the guide angle along which the motor shaft must be laterally adjustable to produce the axial displacement necessary to keep the belt in a plane at right angles to the axes of the driving and driven shafts;

Figure 3:
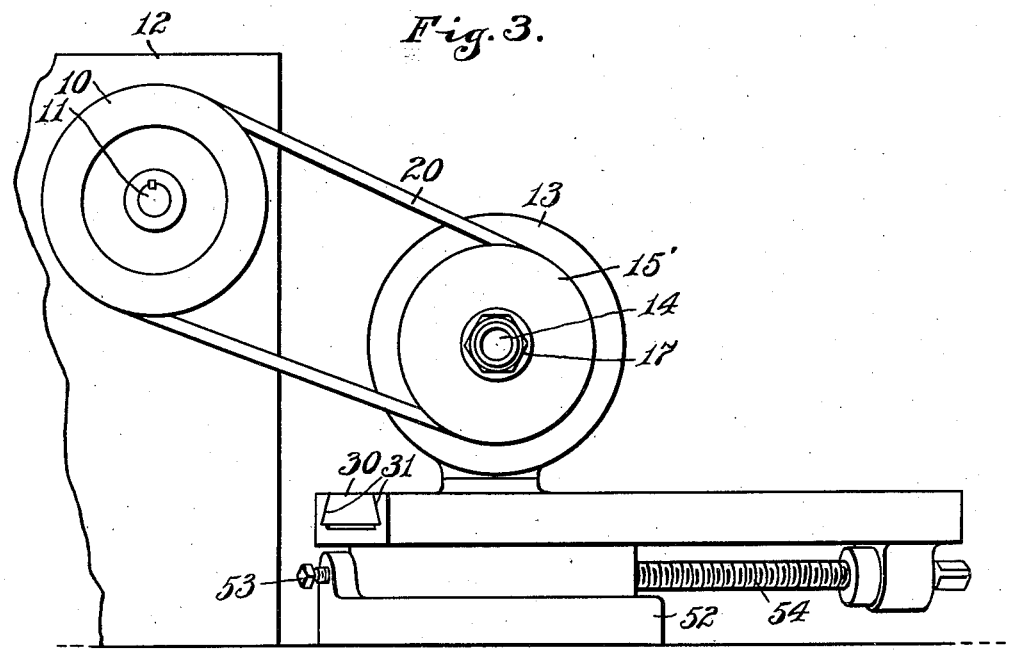
Fig. 3 is a view similar to Fig. 2 but with the motor shaft arranged for adjustment in a plane other than the plane of the driven shaft.
Figure 5:
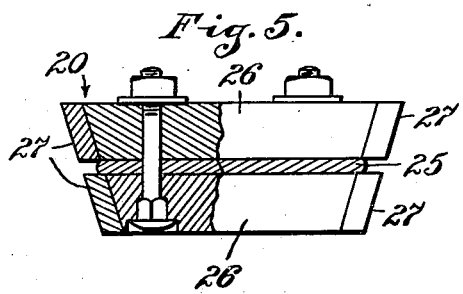
Fig. 5 is a transverse section of a V-belt of the "Reeves-transmission" type which is more efficient, in larger powers, than the solid leather belt indicated in the other figures.

In the drawings 10 indicates a fixed-diameter grooved pulley carried by shaft 11 of any mechanism 12 which is to be driven at variable speeds.

The driving motor 13, most conveniently a small electric motor, has secured to its shaft 14 an axially fixed cone 15 having a sleeve-hub upon which is splined an opposed cone 15' urged toward cone 15 by a spring 16 which may be placed under any desired degree of compression by nut 17 mounted on the sleeve of cone 15.

Passing over the pulley 10 and between the cones 15, 15', with its edges in frictional contact with the cone faces, is an endless V-belt 20. The belt 20, for small power machines, may be conveniently an ordinary thick leather belt with its edges chamfered to a proper angle to efficiently frictionally coact with the cone surfaces, and for larger power transmission the belt 20 may be of the well-known "Reeves" transmission type comprising a central endless web 25 and transverse stiffening blocks 26, 26 the ends of which carry suitable friction faces 27.

The belt 20, being of fixed length, may be caused to engage the cone pair at different radii by varying the distance between the centers of the two shafts 11 and 14, spring 16 serving to keep the cones in proper engagement with the edges of the belt, but variation of the distances between the shaft centers causes a variation in the distance between the two cones so that the transverse plane medially between the cones will shift axially of the driving shaft.

Proper operation of a V-belt requires that the median planes of the two coacting grooved pulleys must at all times be coincident and consequently in order that these two median planes may at all times be coincident it is necessary to axially shift one shaft or the other concurrently with the lateral shifting of one shaft or the other. Most conveniently the concurrent axial and lateral changing of relationship between the shafts is accomplished by proper movement of one shaft and this movable shaft is preferably the shaft 14 which carries the cone pair which, in turn, is most conveniently the shaft of the driving motor.

The amount of variation of distance between the shaft centers in order to get the desired range of speed variation will be first dependent upon the desired difference between maximum and minimum operating radii of the cones, i. e., the radii of the desired maximum and minimum contacts between the belt and the cones; second, upon the pitch of the cones, i. e., one-half the conical angle; and third, upon the relation which the plane of movement of the shiftable shaft bears to a parallel plane passing through the fixed shaft, i. e., upon whether or not the plane of movement of the movable shaft passes through the axis of the fixed shaft or is tangent thereto at a greater or lesser radius.

In practice, for many years, speed-varying friction cones have been found to be most efficient if the conical angle is 144 degrees, i. e., the cone face is pitched 18 degrees from the transverse medial plane between the cones.

In order to simultaneously vary the distance between the centers of shafts 11 and 14, to obtain desired speed variation, and at the same time shift the cone 15 axially so that the medial transverse plane between the cones will at all times be coincident with the medial transverse plane of the fixed diameter pulley 10, the motor 13 is mounted upon a carriage 30 which is slidably supported in guideways 31 which lie at an appropriate angle to the axes of the two shafts 11 and 14.

It has heretofore been supposed (see for instance U. S. Patent 998,733, issued July 25, 1911 to Alfred Aichele) that the necessary angle of sliding movement should be the angle of the cone faces, but when such an arrangement is produced it has been found that, except in one position of speed adjustment, the belt has such a tendency to ride the flanges of the fixed-diameter pulley that the belt soon becomes so edge-worn as to make the apparatus commercially impracticable.

I have discovered the fundamental error which resides in the disclosure of the above-mentioned patent, said fundamental error being, that the angle of lateral movement of the cone pair, instead of being equal to the cone angle, must be a very much smaller angle, the exact angularity of which is dependent primarily (assuming any given cone angle), upon the relation which the plane of lateral movement of the motor shaft bears to the plane of the fixed shaft.

I illustrate in the diagram of Fig. 4 a graphic method of determining the necessary adjustment angle.

In this diagram I indicate the cone pair in five successive positions, A, B, C, D and E, position A assuming a lateral adjustment in the plane AP passing through the axis of shaft 11; position B having an adjustment plane BP displaced from plane AP a distance equal to the sine of an angle of twenty-two and one-half degrees multiplied by the minimum distance between the shaft centers, (i. e., the belt 20 at that time having its largest radius of contact with the cone pair); and positions C, D and E indicating adjustment planes CP, DP and EP displaced from plane AP forty-five degrees, sixty-seven and one-half degrees and ninety degrees respectively.

The arc X, having a radius equal to the minimum distance between the shaft centers, will pass through the centers of shaft 14 at its various positions A, B, C, D and E. Assuming that, in position A, shaft 14 must be moved to position AM where it is at its maximum distance from shaft 11, to thus cause minimum radius of contact between belt 20 and the cone pair, an arc Y drawn through the center of shaft 14 at position AM and with the center at the axis of shaft 11, will be the locus of maximum position centers of shaft 14. The distance 40 between the centers of shaft 14 in positions A and AM, in the plane AP, will thus be the amount of lateral shift which will be necessary to produce the desired contact radius variation between the belt 20 and the cone pair, when the shaft 14 is laterally shifted in plane AP. Correspondingly, the distances 41, 42, 43 and 44 will be the corresponding necessary lateral movements of shaft 14 when the lateral adjustment occurs respectively in planes BP, DP and EP. Referring now to the lower part of diagram 4, it will be noted that the fixed diameter pulley 10 and the cone pair 15 and 15' and shafts 11 and 14 in minimum and maximum positions 14A and 14AM, are shown in plan.

In order that there may be no tendency of the belt 20 to ride one flange or the other of the grooved pulley 10, it must be assumed that the edge Z of belt 20 will remain in a fixed plane. Line Z therefore, in the drawing may be taken as a base line and lines $a1$, $b1$, $c1$, and $d1$ drawn respectively through the shaft centers 14 in the respective positions A, B, C and D parallel with the line $e1$ which is the plan axis of shaft 11 will intersect line Z at the points $za1$, $zb1$, $zc1$, $zd1$ and $ze1$ respectively. Line ZM, parallel with line Z, indicates the maximum permissible axial displacement of cone 15 necessary to obtain the required amount of lateral displacement of shaft 14 to attain its maximum distance from shaft 11. If lines $a2$, $b2$, etc., be now drawn parallel to lines $a1$, $b1$, $c1$, etc., until they intersect line ZM at points $za2$, $zb2$, $zc2$, $zd2$ and $ze2$, lines connecting points $za1$—$za2$, $zb1$—$zb2$, $zc1$—$zc2$, $zd1$—$zd2$, and $ze1$—$ze2$, each will indicate the required line of adjustment movement of the motor to give the required axial movement of shaft 14, concurrent with the required lateral movement, to at all times maintain the medial transverse plane between the cone pair coincident with the medial transverse plane of pulley 10, and the belt will at all times remain in a plane at right angles to the axes of the two shafts 11 and 14.

In the diagram the assumption has been that the necessary lateral movement of shaft 14 in position A will be approximately 2¾"; in position B approximately 3"; in position C approximately 3⅝"; in position D approximately 5⅛" and in position E approximately 8½", and the corresponding angular positions of the guideway relative to the belt line Z will be respectively approximately 13 degrees, 11 degrees, 9½ degrees, 6½ degrees and 4 degrees.

I have not attempted to state, to a high degree of accuracy, the precise guide angles because slight variations from mathematical accuracy are permissible without serious deterioration of the belt, but, by following the graphic method outlined above, the necessary guide angle may be approximated within reasonable commercial limits, said guide angle being in all instances materially less than the pitch of the cone, and being dependent upon the relation between the adjustment plane of the adjustable shaft and a parallel plane which passes through the axis of the fixed shaft.

Theoretically, variations in the minimum distance between the shaft centers introduces another variable because variations in belt length will be accompanied by variations in the percentage of arc contact between the belt and cones but in power transmission units for which this construction is especially designed most economically are so proportioned that the minimum distance between the shafts varies only a comparatively few inches and the belt length variable has been found to be so inconsequential that it may be safely ignored. In any event, the graphic method of determining the adjustment angle takes care of this variable.

I have found in actual practice that when the guide angle is properly proportioned, in accordance with the above disclosure, my improved speed-varying transmission unit may be readily adjusted through its entire range without causing any tendency in the belt to ride the flanges of the fixed diameter pulley or to twist between the cones, and that the unit is exceedingly efficient in small units where the two shafts 11 and 14 may be arranged quite close together.

The perfect angular relation between a plane normal to the axes of the shafts 11 and 14 and the axis of the screw shaft 54 may be determined mathematically as well. For most commercial purposes, this angular relation may be determined in the following manner:—

Let V = effective diameter of sheave 10.
    X = maximum effective diameter of discs 15 and 15′.
    N = Minimum effective diameter of discs 15 and 15′.
    $C_x$ = Minimum distance between the shafts 11 and 14.
    $C_n$ = Maximum distance between the shafts 11 and 14.
    S = Angle between axis of shaft 54 and the plane normal to axes of shafts 11 and 14.
    A = Cone angle.
    D = One-half tan A.

Then $$\tan S = \frac{\frac{X-N}{2}\tan A}{\sqrt{\left[\frac{\left(\frac{X+V}{2}\pi + 2\sqrt{\left(\frac{X-V}{2}\right)^2 + C_z}\right) - \left(\frac{N+V}{2}\right)\pi}{2}\right]^2 - \left(\frac{N-V}{2}\right)^2 - C_z}}$$

or $$\tan S = \frac{D(X-N)}{\sqrt{\left[\frac{\left(\frac{X+V}{2}\pi + 2\sqrt{\left(\frac{X-V}{2}\right)^2 + C_z}\right) - \left(\frac{N+V}{2}\right)\pi}{2}\right]^2 - \left(\frac{N-V}{2}\right)^2 - C_z}}$$

This expression may be condensed to read $$\tan S = \frac{\frac{1}{2}(X-N)\tan A}{C_n - C_x}$$

While, as has been said, the above calculations will give results which are fairly satisfactory, the following formula is an exact expression of the value of the required angle between the axis of the screw shaft 54 and the plane normal to the axes of the shafts 11 and 14.

$$\tan S = \frac{2D(X-N)}{\sqrt{[B - 1.57(V+N)]^2 - [(V-N)^2 + (2P)^2]} - \sqrt{[B - 1.57(X+V)]^2 - [(X-V)^2 + (2P)^2]}}$$

Where B = Belt length.
    P = Perpendicular distance from shaft 11 to the plane generated by movement of shaft 14.

This expression may be simplified to read $$\tan S = \frac{\frac{1}{2}(X-N)\tan A}{T}$$

Where T equals the difference between the projection of $C_n$ on the travel plane of the axis of shaft 14 and the projection of $C_x$ on said travel plane.

It will be understood, of course, that the pulley 10 and the entire machine to which it is attached, might be the laterally and axially shiftable element but as a general proposition that will be an inconvenient arrangement.

In order to adapt the power unit for ready application to various machines without the necessity of placing the driving shaft in any particular adjustment plane relative to the driven shaft, the motor 13 is carried on a stud 50 journaled in carriage 30 and held in adjusted position by a set screw 51. Guide 31 is, in turn, rotatably adjustable on base 52 and held in adjusted position by set screw 53. By this arrangement guide 31 may be set at a proper angle relative to the axis of the driven shaft 11 and the driving shaft 14 may be brought to parallelism with shaft 11 for any angular position of guide 31. A screw 54, journaled in guide 31 and threaded through carriage 30, serves to shift carriage 30 in guide 31 to adjust the apparatus for desired speed.

It will be readily understood that the cone pair may be mounted upon the driven shaft and the cooperating grooved belt pulley may be mounted upon the motor or driving shaft, without departing from the spirit of my invention.

I claim as my invention:

1. A speed-varying power-transmission unit comprising a motor, a friction cone axially fixed on the motor shaft, an oppositely set friction cone axially shiftable relative to the first cone, a spring carried by the shaft and acting upon said second cone to yieldingly urge it toward the first cone, a V-belt coacting with said two cones, a fixed-diameter pulley coacting with and laterally confining said V-belt, an angularly set supporting guideway for said motor, the axis of said guideway being angularly related to the axis of the cones according to the following formula:

$$\tan S = \frac{\frac{1}{2}(X-N)\tan A}{T}$$

2. A speed-varying power-transmission unit comprising a base, a guide-way angularly adjustable on the base, a carriage slidably mounted in said guide-way, a motor angularly adjustable on the carriage, a cone-pair carried by the shaft of said motor and one cone spring biased axially toward the companion cone, means by which the carriage may be positioned along the guideway, and a V-belt to cooperate with the cone pair.

3. A speed-varying power transmission mechanism comprising a driving shaft and a driven shaft, a friction cone axially fixed on one of said shafts, an oppositely set friction cone axially shiftable relative to the first cone and splined upon said last-mentioned shaft, a spring carried by said last-mentioned shaft and acting upon said second cone to yieldingly urge it toward the first cone, a fixed-diameter pulley mounted upon the other shaft, a V-belt coacting with said two cones and said pulley and laterally confined thereby, a support for one of said shafts shiftable transversely of the axis of said shaft, an angularly set guideway for said support, said guideway being angularly related to the axis of the cones according to the following formula:—

$$\tan S = \frac{\frac{1}{2}(X-N)\tan A}{T}$$

4. A power-transmission unit comprising a base, a guideway angularly adjustable on the base, a carriage slidably mounted in said guideway, a motor angularly adjustable on the carriage about an axis transverse to the plane of the guideway, a belt-receiving structure carried by the motor shaft and formed to laterally restrain a V-belt, and means by which the carriage may be adjustably positioned along the guideway.

5. A speed-varying power-transmission unit comprising a shaft, a second shaft, a pair of oppositely set friction cones mounted on one of said shafts, one of said cones being axially shiftable, a spring urging said one cone toward the other cone, a fixed-diameter pulley mounted on the other of said shafts, an edge-active belt coacting with said cones and with said pulley and laterally confined by said pulley, a supporting guideway for one of said shafts, the axis of said guideway being angularly related to the axes of said shafts according to the following formula:—

$$\tan S = \frac{\frac{1}{2}(X-N)\tan A}{T}$$

6. A speed-varying power-transmission unit comprising a motor, a friction cone axially fixed on the motor shaft, an oppositely set friction cone axially shiftable relative to the first cone, a spring carried by the shaft and acting upon said second cone to yieldingly urge it toward the first cone, a V-belt coacting with said two cones, a fixed-diameter pulley coacting with and laterally confining said V-belt, an angularly set supporting guideway for said motor, the axis of said guideway being angularly related to the axis of the cones according to the following formula:—

$$\tan S = \frac{\frac{1}{2}(X-N)\tan A}{C_n - C_x}$$

7. A speed-varying power-transmission unit comprising a shaft, a second shaft, a pair of oppositely set friction cones mounted on one of said shafts, one of said cones being axially shiftable, a spring urging said one cone toward the other cone, a fixed-diameter pulley mounted on the other of said shafts, an edge-active belt coacting with said cones and with said pulley and laterally confined by said pulley, a supporting guideway for one of said shafts, the axis of said guideway being angularly related to the axes of said shafts according to the following formula:—

$$\tan S = \frac{\frac{1}{2}(X-N)\tan A}{C_n - C_x}$$

8. A speed-varying power-transmission mechanism comprising a driving shaft and a driven shaft, a friction cone axially fixed on one of said shafts, an oppositely set friction cone axially shiftable relative to the first cone and splined upon said last-mentioned shaft, means acting upon said second cone to yieldingly urge it toward the first cone, a fixed-diameter pulley mounted upon the other shaft, a V-belt coacting with said two cones and said pulley and laterally confined thereby, a support for one of said shafts shiftable transversely of the axis of said shaft, an angularly set guideway for said support, said guideway being angularly related to the axis of the cones according to the following formula:—

$$\tan S = \frac{\frac{1}{2}(X-N)\tan A}{C_n - C_x}$$

PAUL B. REEVES.